(12) United States Patent
Boon

(10) Patent No.: US 6,360,014 B1
(45) Date of Patent: Mar. 19, 2002

(54) IMAGE DECODING METHOD, IMAGE DECODING APPARATUS, AND DATA RECORDING MEDIUM

(75) Inventor: Choong Seng Boon, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/160,115

(22) Filed: Sep. 24, 1998

(30) Foreign Application Priority Data

Sep. 26, 1997 (JP) .............................. 9-262126

(51) Int. Cl.$^7$ .............................. G06K 9/36; G06K 9/46
(52) U.S. Cl. .................................. 382/233; 382/166
(58) Field of Search ................................ 382/162, 163, 382/166, 233, 236, 248, 246; 345/1, 3, 115

(56) References Cited

U.S. PATENT DOCUMENTS

| | | |
|---|---|---|
| 5,068,744 A | 11/1991 | Ito |
| 5,532,746 A | 7/1996 | Chang |
| 5,699,170 A | 12/1997 | Yokose et al. |
| 5,841,418 A | * 11/1998 | Bril et al. ...................... 345/3 |

FOREIGN PATENT DOCUMENTS

| | | |
|---|---|---|
| EP | 0 572 024 A2 | 5/1993 |
| EP | 0 595 544 A2 | 10/1993 |
| EP | 0 665 527 A1 | 1/1995 |
| EP | 0 706 164 A1 | 4/1996 |
| JP | 5-328141 | 12/1993 |
| JP | 7-66913 | 10/1995 |
| JP | 2724071 | 11/1997 |
| KR | 95-16346 | 6/1995 |

OTHER PUBLICATIONS

Patent Abstracts of Japan, vol. 011, No. 340 (P–634), Nov. 7, 1987 & JP 62–123540 A (Matsushita Electric Works Ltd.), Jun. 4, 1987 *abstract*.

* cited by examiner

*Primary Examiner*—Phuoc Tran
(74) *Attorney, Agent, or Firm*—Burr & Brown

(57) ABSTRACT

An image decoding method for decoding compressively coded data including coded data obtained by coding a luminance signal and a color difference signal to reproduce an image signal for image display, comprises the steps of: decoding the coded data of the luminance signal and the coded data of the color difference signal in the color display mode of color display of an image; and decoding the coded data of the luminance signal in the monochrome display mode of monochrome display of an image.

14 Claims, 10 Drawing Sheets

Fig.8 (a)

DCT coefficients

| a | b | c | 0 |
|---|---|---|---|
| 0 | 0 | d | 0 |
| 0 | 0 | 0 | 0 |
| 0 | 0 | 0 | 0 |

quantized DCT coefficients
(quantization values)

| A | B | C | 0 |
|---|---|---|---|
| 0 | 0 | D | 0 |
| 0 | 0 | 0 | 0 |
| 0 | 0 | 0 | 0 |

| run | level | code |
|-----|-------|------|
| 0   | A     | 11   |
| 0   | B     | 0100 |
| 3   | C     | 00111 |
| 1   | D     | 000110 |
| EOB |       | 10   |

| VLC code | run | level |
|----------|-----|-------|
| 10       | EOB |       |
| 11       | 0   | 1     |
| 011      | 1   | 1     |
| 0100     | 0   | 2     |
| ⋮        | ⋮   | ⋮     |
| 00111    | 3   | 1     |
| ⋮        | ⋮   | ⋮     |
| 000110   | 1   | 2     |
| ⋮        | ⋮   | ⋮     |

(run, level)
= (0,1)  (0,2)  (3,1)  (1,2)
   ↓      ↓      ↓      ↓       (EOB)
..... 11   0100   00111  000110   10 .....

Fig.10 (a)

DCT coefficients

| a | b | c | 0 |
|---|---|---|---|
| 0 | 0 | d | 0 |
| 0 | 0 | 0 | 0 |
| 0 | 0 | 0 | 0 |

quantized DCT coefficients
(quantization values)

| A | B | C | 0 |
|---|---|---|---|
| 0 | 0 | D | 0 |
| 0 | 0 | 0 | 0 |
| 0 | 0 | 0 | 0 |

| last | run | level | VLC code |
|------|-----|-------|----------|
| 0 | 0 | A | 11 |
| 0 | 0 | B | 0100 |
| 0 | 3 | C | 00111 |
| 1 | 1 | D | 000100 |

| VLC code | last | run | level |
|----------|------|-----|-------|
| 11 | 0 | 0 | 1 |
| 011 | 0 | 1 | 1 |
| 010 | 1 | 1 | 1 |
| 0100 | 0 | 0 | 2 |
| ⋮ | ⋮ | ⋮ | ⋮ |
| 00111 | 0 | 3 | 1 |
| ⋮ | ⋮ | ⋮ | ⋮ |
| 000110 | 0 | 1 | 2 |
| ⋮ | ⋮ | ⋮ | ⋮ |
| 000100 | 1 | 1 | 2 |
| ⋮ | ⋮ | ⋮ | ⋮ |

(last, run, level)
= (0,0,1) (0,0,2) (0,3,1) (1,1,2)

..... 11  0100  00111  000100 .....

IMAGE DECODING METHOD, IMAGE DECODING APPARATUS, AND DATA RECORDING MEDIUM

FIELD OF THE INVENTION

The present invention relates to an image decoding method, an image decoding apparatus, and a data recording medium and, more particularly to power saving in a digital image decoding process in the monochrome display mode.

BACKGROUND OF THE INVENTION

In order to store or transmit digital image information efficiently, it is required that digital image information be compressively coded. Currently, there are waveform coding methods such as subband, wavelet, fractal, and so forth, as well as DCT (Discrete Cosine Transform) typical of JPEG (Joint Photographic Coding Experts Group) or MPEG (Moving Picture Experts Group), as a method for compressively coding the digital image information.

Meanwhile, there is a method in which inter-frame prediction is performed using motion compensation by representing values of pixels of a current frame by difference values between these values and values of pixels of a previous frame, and a difference signal of the difference values is subjected to waveform coding, as a method for eliminating redundant image information between adjacent frames or the like.

Hereinafter, a description is given of an image coding method and an image decoding method according to MPEG which employs a DCT process with motion compensation, for explaining a prior art image processing method.

In this image coding method, an input image signal is first divided into plural image signals corresponding to plural blocks ("macroblocks") into which a display screen is divided, and then the image signals are coded for each macroblock. The "macroblock" as defined herein refers to an image display region comprising 16×16 pixels on the display screen.

The image signal of each macroblock is divided into image signals corresponding to subblocks which correspond to image display regions each comprising 8×8 pixels, and then the image signals are subjected to a DCT process for each subblock to generate DCT coefficients of each subblock. The DCT coefficients are quantized to generate quantization values for each subblock. This method for coding the image signal by the DCT process and the quantization process is termed "intra-frame coding" method.

At a receiving end, the quantization values of each subblock are inversely quantized and subjected to an inverse DCT process to reproduce an image signal corresponding to each subblock.

On the other hand, there is a coding method of an image signal termed "inter-frame coding". In this coding method, a macroblock in which errors between pixels thereof and pixels of a target macroblock to-be-coded are the smallest is detected as a prediction macroblock, in a frame which is temporarily adjacent to a frame to-be-coded, by a method for detecting motion of an image on the display screen such as "block matching".

Subsequently, according to the detected image motion, an image signal of a coded frame is subjected to motion compensation, to obtain an optimal image signal for a prediction value of the image signal of the target macroblock. A signal indicating the macroblock (prediction macroblock) with the smallest error is a motion vector.

Hereinbelow, a frame including the prediction macroblock that is to be referred to for generating the prediction value is called a "reference frame".

Thereafter, a difference signal between an image signal of a subblock of the target macroblock and a prediction signal thereof is computed, and then is subjected to the DCT process to generate DCT coefficients, which are quantized to generate quantization values. Then, quantization values for respective subblocks of the target macroblock are transmitted or stored together with the motion information.

At a receiving end, the quantization values (quantized DCT coefficients) are inversely quantized and then subjected to the inverse DCT process to restore the difference signal of each macroblock. Then, an image signal of a decoded reference frame is subjected to motion compensation by the use of the motion vector, to generate the prediction value of an image signal of a target macroblock to-be-decoded. Then, the prediction value and the difference signal are added to reproduce the image signal of the target macroblock.

In this image processing according to MPEG, at a transmitting end, when compressively coding a luminance signal and a color difference signal of a digital image signal, switching between the intra-frame coding and the inter-frame coding is suitably performed for each macroblock, while at a receiving end, switching between the intra-frame decoding and the inter-frame decoding is suitably performed to the compressively coded luminance signal and the compressively coded color difference signal for each macroblock to reproduce the luminance signal and the color difference signal, followed by display of the resulting digital image signal as a color image.

According to the MPEG described above, the image signal is coded in macroblock units each composed of four luminance blocks 701–704 and two color difference blocks 705 and 706, as shown in FIG. 7, and thus coded image signal is transmitted by satellite broadcasting or cable transmission, to be reproduced by an installed receiver or a portable receiver.

In the current situation, power saving, i.e., reduction of power consumed by signal processing, is demanded of the reproducing process of the image signal by the portable receiver.

To be specific, in a case where an image signal is reproduced and displayed as a color image, a coded luminance signal and a coded color difference signal of the image signal are decoded. In this case, for an inter-frame coded image signal, it is necessary to find a prediction value of the color difference signal as well as a prediction value of the luminance signal, which leads to considerable amount of signals processed to find the prediction value, and correspondingly amount of power required for this processing increases.

In color signal display, a reproduced luminance signal "Y" and reproduced color difference signals "U", and "V" must be converted into an RGP signal according to the following equations (1)~(3):

$$R = 1.164(Y-16) + 1.596(U-128) \quad (1)$$

$$G = 1.164(Y-16) - 0.813(U-128) - 0.391(V-128) \quad (2)$$

$$B = 1.164(Y-16) + 2.018(V-128) \quad (3)$$

For this conversion, the color difference signals U and V need multiplication, which consumes considerable power.

Consequently, it is difficult to reproduce and display the image signal processed according to MPEG as the color image with saved power, so that the user cannot see a regenerated image for a long period of time.

SUMMARY OF THE INVENTION

It is an object of the present invention to provide an image decoding method and image decoding apparatus in which compresively coded image signal can be decoded with power consumption saved, and thereby a regenerated image can be displayed on portable terminal equipment for a long period of time, and a data recording medium which contains an image processing program for implementing decoding by this image decoding method.

Other objects and advantages of the present invention will become apparent from the detailed description given hereinafter. It should be understood, however, that the detailed description and specific embodiment are given by way of illustration only, since various changes and modifications within the scope of the invention will become apparent to those skilled in the art from this detailed description.

According to one aspect of the present invention, in the color display mode, coded data of the luminance signal and the coded data of the color difference signal are decoded, while in the monochrome display mode, coded data of the color difference signal is detected, and the detected coded data of the color difference signal is abandoned and the coded data of the luminance signal is decoded. Therefore, the amount of coded data to be decoded and calculations in RGB conversion can be reduced by about 1/3. As a result, power consumption can be suppressed and the image signal can be reproduced and displayed for a long period of time in the portable terminal equipment.

According to another aspect of the present invention, in the color display mode, the frequency coefficients of the luminance signal is restored to the difference data of the luminance signal and the frequency coefficients of the color difference signal is restored to the difference data of the color difference signal, the motion vector is used to obtain the luminance prediction data, which is added to the difference data of the luminance signal, and the scaled motion vector is used to obtain the color difference prediction data, which is added to the difference data of the color difference signal, to reproduce the luminance signal and the color difference signal, while in the monochrome display mode, the frequency coefficients of the luminance signal are restored to the difference data of the luminance signal, the motion vector is used to obtain the luminance prediction data, which is added to the difference data of the luminance signal to reproduce the luminance signal. Therefore, in the process for decoding the coded data corresponding to the inter-macroblock, the scaling process of the motion vector, the process for generating the prediction data of the color difference block, and the process for adding the prediction data and the difference data of the color difference signal, are dispensed with. As a result, amount of signals to-be-processed is considerably reduced in the decoding process, and correspondingly power consumption is effectively reduced.

According to a further aspect of the present invention, a data recording medium contains a program which makes a computer abandon the coded data of the color difference signal and decode the coded data of the luminance signal in the monochrome display mode. By loading the program into the computer, it becomes possible to implement reproducing process of the compressively coded image signal for a long period of time with saved power.

BRIEF DESCRIPTION OF THE DRAWINGS

FIGS. 8 (a)–8(e) are diagrams for explaining variable length coding according to MPEG2 which produces a coded bit stream of the above embodiment, wherein FIG. 8(a) shows a two-dimensional array of quantization values, FIG. 8(b) shows a scanning order of the quantization values, FIG. 8 (c) shows variable length codes of the quantization values, FIG. 8(d) shows a table which lists "variable length code", "run", and "level", and FIG. 8(e) shows a code string of the bit stream of the quantization values.

FIGS. 10(a)–10(e) are diagrams for explaining variable length coding which produces a coded bit stream which includes an identification bit of the last DCT coefficient, wherein FIG. 10(a) shows a two-dimensional array of quantization values, FIG. 10(b) shows a scanning order of the quantization values, FIG. 8 (c) shows variable length codes of the quantization values, FIG. 10(d) shows a table which lists "variable length code", "last", "run", and "level", and FIG. 10(e) shows a code string of the bit stream of the quantization values.

DETAILED DESCRIPTION OF THE PREFERRED EMBODIMENTS

Now, a description will be given of a preferred embodiment of the present invention.

Figure 1:
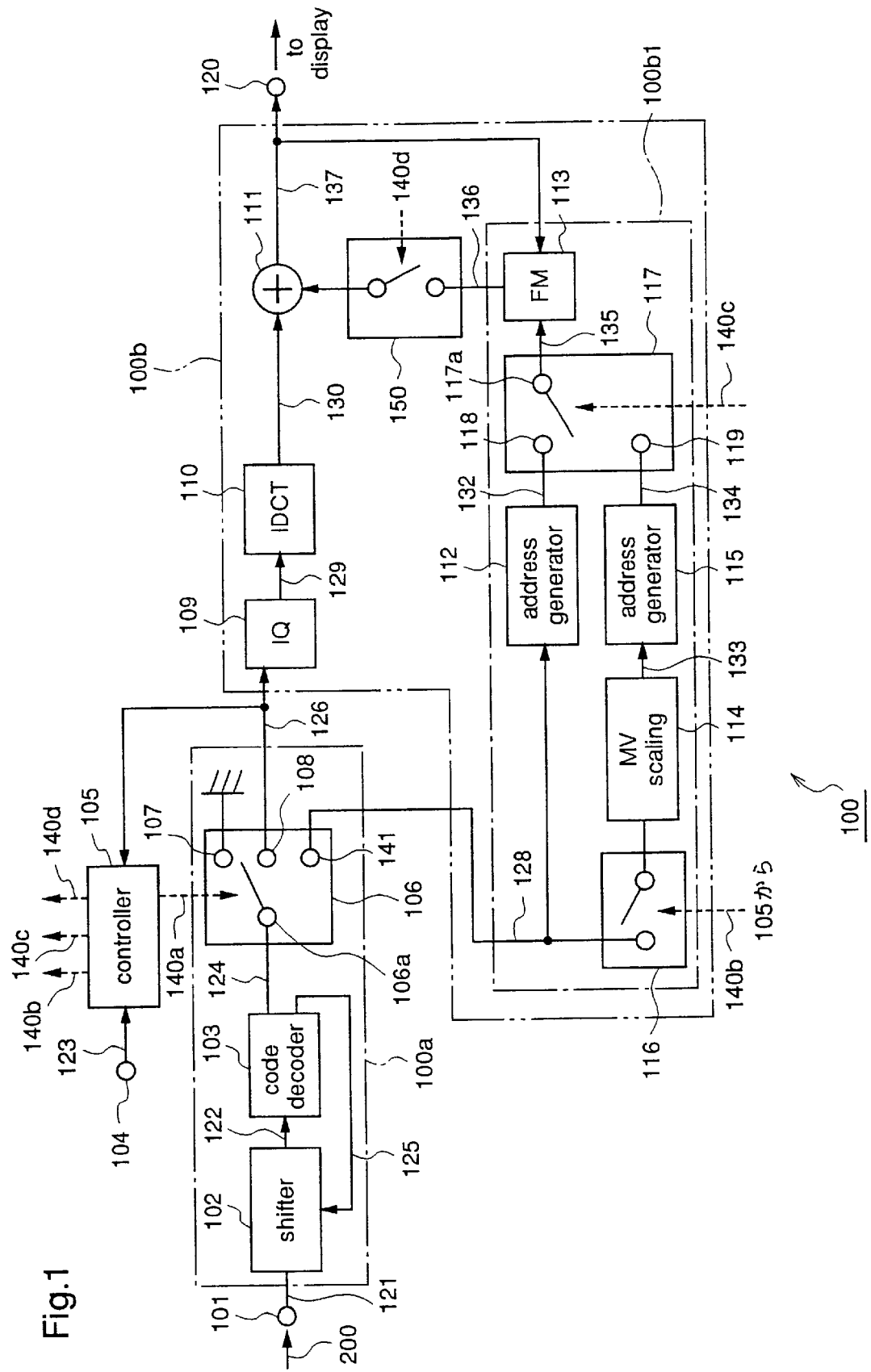
FIG. 1 is a block diagram showing a digital image decoding apparatus according to a first embodiment of the present invention.

FIG. 1 is a block diagram showing a digital image decoding apparatus according to this embodiment. In the figure, reference numeral 100 designates the image decoding apparatus which decodes compressively coded data of a digital image signal to reproduce an image signal, the reproduced output of which is displayed on a display (not shown). First, a description is given of a construction of the image decoding apparatus 100.

The image decoding apparatus 100 includes a variable length decoding unit 100a which receives a bit stream 200 including coded data of a luminance signal and coded data of a color difference signal of an image signal, performs variable length decoding to the bit stream, and outputs quantization values of a luminance block and quantization values of a color difference block of an intra-macroblock or an inter-macroblock, a motion vector of each inter-macroblock, and control data.

The intra-macroblock is a block in which the corresponding image signal has been intra-frame coded, and the inter-macroblock is a block in which the corresponding image signal has been inter-frame coded.

The image decoding apparatus 100 further includes an information source decoding unit 100b which performs information source decoding to the quantization values by the use of the motion vector as necessary, and a controller 105 which controls the variable length decoding unit 100a and the information source decoding unit 100b by the use of a display mode signal 123 externally input and the control data output from the variable length decoding unit 100a, respectively. The display mode signal 123 supplied to the controller 105 indicates that a display mode of a decoded image signal is a monochrome display mode or a color display mode, and is set by the user. Alternatively, the image decoding apparatus 100 may include a generator for generating the display mode signal 123 which switches automatically from the color display mode to the monochrome display mode when a power voltage applied to the apparatus 100 drops below a predetermined level.

The variable length decoding unit 100a includes a shifter 102 which has a data storage area in which a prescribed number of bits, for example, 16 or 32 bits, of a code (data of each bit) of the bit stream 200 can be stored, outputs the stored code string, and shifts the code of the bit stream 200 by the number of bits according to a shift control signal 125. The variable length decoding unit 100a further includes a code decoder 103 which decodes the code string (code) output from the shifter 102, and outputs data corresponding to a decoded code, and the shift control signal 125 in accordance with which the shifter 102 performs shifting by the number of bits of the decoded code, and a switch 106 which performs switching in accordance with a control signal 140a from the controller 105, to output the data output from the code decoder 103 to the information source decoding unit 100b or abandon the same.

The code decoder 103 includes a code table which contains data such as codes, the corresponding quantization values, the corresponding motion vectors, and the corresponding control values, and a matching circuit which compares a code included in a code string input to the decoder 103 to the codes contained in the code table, and outputs data corresponding to the code contained therein which matches the input code.

The information source decoding unit 100b includes an inverse quantizer 109 which inversely quantizes the quantization values output from the variable length decoding unit 100a for each of subblocks of a macroblock to reproduce the DCT coefficients of each subblock, and an inverse DCT unit 110 which subjects the reproduced DCT coefficients to inverse DCT process and outputs an image signal or a difference signal of each subblock.

The information source decoding unit 100b further includes prediction value generating means 100b1 which generates a prediction value of an image signal corresponding to a target inter-macroblock to-be-decoded based on a decoded image signal 137 and a motion vector 128, an adder 111 which adds the prediction value to the difference signal output from the inverse DCT unit 110, and outputs the resulting addition value 137, and an ON/OF switch 150 provided between the adder 111 and the prediction value generating means 100b1, for performing switching of supplying the prediction value to the adder 111, in accordance with the control signal 140d, and is used to output the image signal output from the inverse DCT unit 110 as the image signal corresponding to the intra-macroblock, and the addition value 137 as the image signal corresponding to the inter-macroblock.

The prediction value generating means 100b1 includes a frame memory 113 which temporarily stores the decoded image signal of one frame or a prescribed number of frames, and a first address generator 112 which receives the motion vector 128 output from the variable length decoding unit 100a and generates an address of the frame memory 113. The generating means 100b 1 further includes a motion vector scaling unit 114 which scales the motion vector of the luminance block so as to correspond to that of the color difference block, a second address generator 115 which generates an address of the frame memory 113 according to the scaled motion vector, a switch 116 provided between the scaling unit 114 and the variable length decoding unit 100a and on-off controlled by a control signal 140b from the controller 105, and a switch 117 which selects one of outputs of the first and second address generators 112 and 115 in accordance with a control signal 140c from the controller 105, and supplies the selected output to the frame memory 113.

Thus constructed image decoding apparatus 100 is adapted to receive a bit stream including intra-frame coded data generated by intra-frame coding of a digital image signal and inter-frame coded data generated by inter-frame coding of a digital image signal, as compressively coded data Next, a brief description is given of a data structure of a bit stream 200 input to the image decoding apparatus 100 and coding process for generating the bit stream 200.

Figure 7:
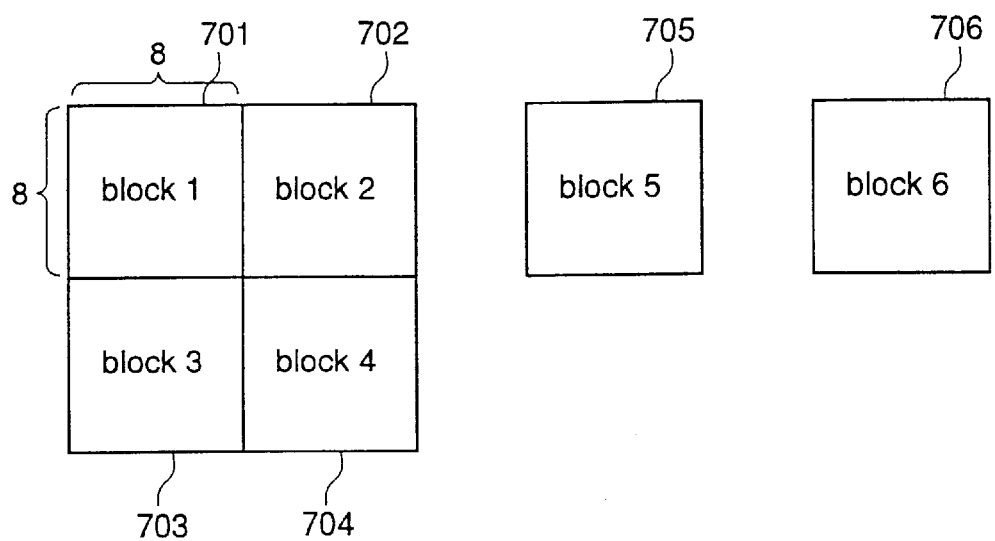
FIG. 7 is a diagram showing coding units of compressively coded data processed by the data image decoding apparatus.

In the intra-frame coding process, an image signal comprising a luminance signal and a color difference signal is divided into image signals corresponding to the macroblocks, and the divided image signals are compressively coded for each macroblock. To be specific, the image signal of each macroblock is transformed into frequency coefficients by DCT process for each of subblocks of the macroblock. The subblocks are four luminance blocks 701–704 each comprising 8×8 pixels and corresponding to the luminance signal and two color difference blocks 705 and 706 each comprising 8×8 pixels and corresponding to the color difference signal, as shown in FIG. 7. The frequency coefficients of each subblock are quantized by a prescribed quantization scale to generate quantization values, which are variable length coded to produce coded data corresponding to the macroblock.

In the inter-frame coding process, correlation between frames is used to detect a prediction macroblock where a difference value between an image signal thereof and an image signal of the target macroblock is the smallest in the motion compensation mode, and then a difference value of image signals between the prediction macroblock and the target macroblock is transformed into frequency coefficients by DCT process. The frequency coefficients are quantized into quantization values. The quantization values and the motion vector of the target macroblock are variable length coded and multiplexed to produce coded data corresponding to the macroblock.

Figure 2:
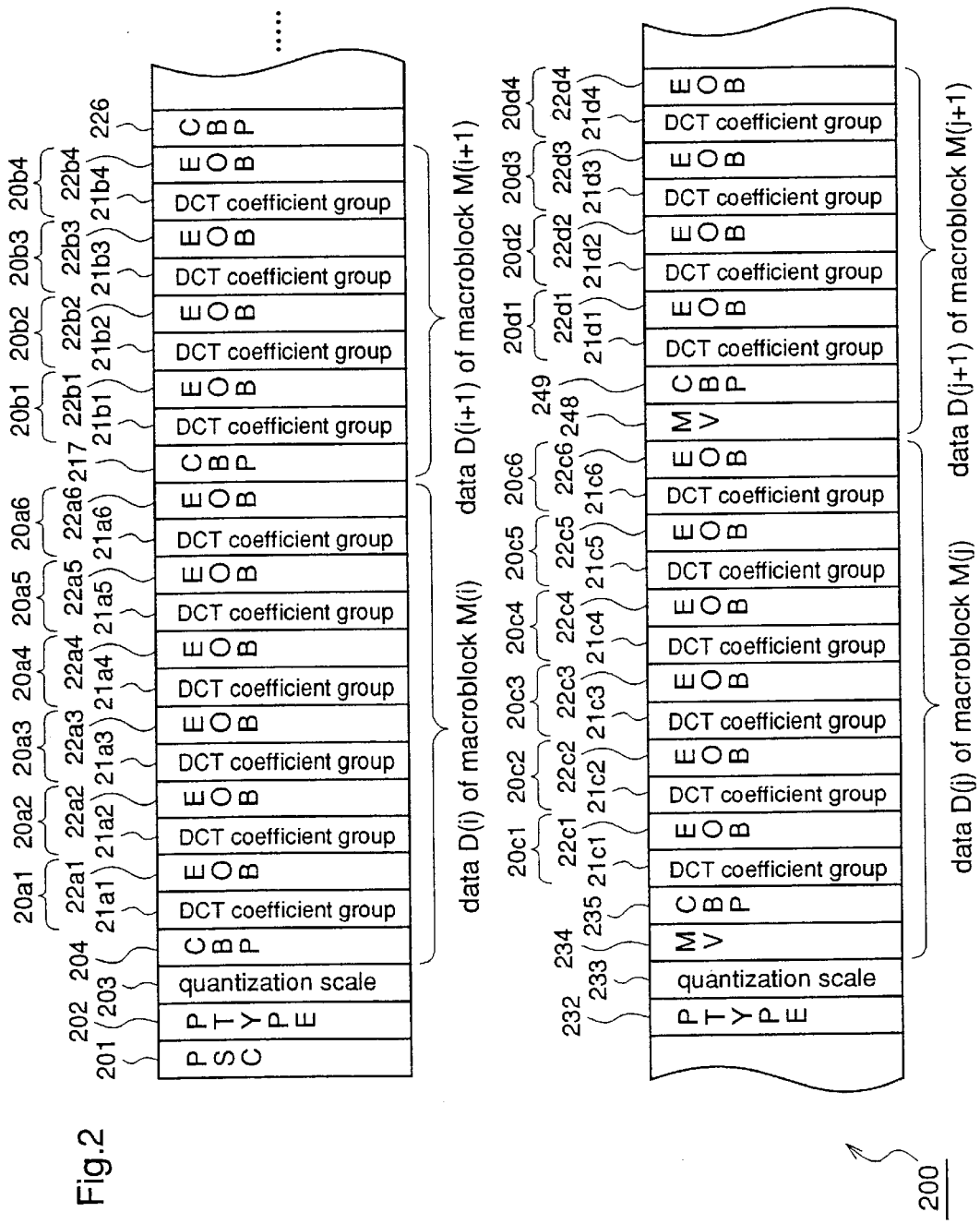
FIG. 2 is a diagram showing a structure of compressively coded data processed by the digital image decoding apparatus.

FIG. 2 shows a structure of the bit stream 200 including the intra-coded data and the inter-coded data. The bit stream 200 comprises a synchronous signal (PSC) 201 represented as a unique 32-bit code, PTYPE data 202 and 232 each indicating whether the corresponding image signal has been intra-frame coded or inter-frame coded by the use of a 2-bit code, quantization scale data 203 and 233 each indicating a quantization scale in quantization of coding process by a 5-bit code, and data D(i), D(i+1) , . . . ,D(j), D(j+1), . . . corresponding to macroblocks M (i), M (i+1), . . . , M(j), M(j+1), . . . , respectively. The PTYPE data 202 indicates the intra-frame coding and the PTYPE data 232 indicates the inter-frame coding. The macroblocks M(i) and M(i+1) are intra-macroblocks in which the corresponding signals have been intra-frame coded. The macroblocks M(j) and M (j+1) are inter-macroblocks in which the corresponding image signals have been inter-frame coded.

The data D(i) comprises CBP data 204 and block information 20a1–20a6, and the data D(i+1) comprises CBP data 217 and block information 20b1–20b4. The CBP data 204 and 217 are each represented as a 6-bit code, and each indicates whether or not each subblock of the corresponding macroblock contains DCT coefficients by the use of one bit. In the CBP data 204 and 217, the code is "1" when the subblock contains DCT coefficients, and the code is "0" when the subblock contains no DCT coefficients. The block information 20a1–20a6, and 20b1–20b4 each comprises a DCT coefficient group in each subblock and EOP data indicating a last DCT coefficient in the DCT coefficient group. The block information 20a1–20a6 comprises a DCT coefficient group 21a1 and EOB data 22a1, a DCT coefficient group 21a2 and EOB data 22a2, a DCT coefficient group 21a3 and EOB data 22a3, a DCT coefficient group 21a4 and EOB data 22a4, a DCT coefficient group 21a5 and EOB data 22a5, and a DCT coefficient group 21a6 and EOB data 22a6, respectively. The block information 20b1–20b4 comprises a DCT coefficient group 21b1 and EOB data 22b1, a DCT coefficient group 21b2 and EOB data 22b2, a DCT coefficient group 21b3 and EOB data 22b3, and a DCT coefficient group 21b4 and the EOB data 22b4 respectively.

The data D(j) comprises a variable length coded motion vector 234, CBP data 235, and block information 20c1–20c6, and the data D(j+1) comprises a variable length coded motion vector 248, CBP data 249, and block information 20d1–20d4. The CBP data 235 and 249 are each represented as a 6-bit code, and each indicates whether or not each subblock of the corresponding macroblock contains DCT coefficients by the use of one bit. In the CBP data 235 and 249, the code is "1" when the subblock contains DCT coefficients, and the code is "0" when the subblock contains no DCT coefficients. The block information 20c1–20c6, and 20d1–20d4 each comprises a DCT coefficient group in each subblock and EOP data indicating a last DCT coefficient in the DCT coefficient group. The block information 20c1–20c6 comprises a DCT coefficient group 21c1 and EOB data 22c1, a DCT coefficient group 21c2 and EOB data 22c2, a DCT coefficient group 21c3 and EOB data 22c3, a DCT coefficient group 21c4 and SOB data 22c4, a DCT coefficient group 21c5 and EOB data 22c5, and a DCT coefficient group 21c6 and EOB data 22c6, respectively. The block information 20d1–20d4 comprises a DCT coefficient group 21d1 and EOS data 22d1, a DCT coefficient group 21d2 and EOB data 22d2, a DCT coefficient group 21d3 and EOB data 22d3, and a DCT coefficient group 21d4 and EOB data 22d4 respectively.

In this bit stream 200, data corresponding to respective macroblocks of a display screen is sequentially aligned.

In the DCT coefficient groups 21a1–21a6, 21b1–21b4, 21c–21c6, and 21d1–21d4 shown in FIG. 2, aligned are codes obtained by variable length coding of quantization values of plural DCT coefficients in each subblock.

Hereinafter, a description is given of this variable length coding with reference to FIGS. 8(a)–8(e).

FIG. 8(a) shows an array of DCT coefficients obtained by subjecting an image signal corresponding to a subblock to DCT process, in a frequency domain. For the sake of simplicity, here it is assumed that the subblock corresponds to an image space comprising 4×4 pixels.

In a frequency domain F corresponding to the subblock, values of the first to third coefficients a, b, and c on the uppermost row, and the third coefficient d on the next uppermost row are "non-zero", and values of the other coefficients are "zero", as shown in FIG. 8(a). The quantization values A–D obtained by quantizing the DCT coefficients a–d in the frequency domain F. are variable length coded in the order indicated by a dotted arrow S (scanning-order), as shown in FIG. 8(b). In this case, the quantization value D is lastly variable length coded, among the quantization values A–D.

FIG. 8(c) shows correspondence between the quantized DCT coefficients and codes obtained by performing variable length coding thereto. In the variable length coding process of the quantization values, combination (hereinafter referred to as an event) of a level of a quantization value "non-zero" (level) and the number of quantization values "zero" positioned ahead of the quantization value "non-zero" in the scanning order is converted into one variable length code according to a variable length coding table T shown in FIG. 8(d). The variable length coding table T lists variable length codes of respective events. In this table T, a code "10" of the EOB data is shown. It should be remembered that actual quantization levels have positive and negative values, although these are not shown for simplicity.

Assume that the quantization values A–D are A=1, B=2, C=1, and D=2, respectively. The quantization value A forms an event (0, 1), and is converted into a variable length code "11" according to the table T. In a like manner, the quantization values B, C, and D form events (0, 2), (3, 1), and (1, 2), and are converted into variable length codes "0100", "00111", and "000110", respectively, according to the table T.

The code string of the DCT coefficient group and the EOP data of the subblock in FIG. 8(a) is, as shown in FIG. 8(e), ". . . 1101000011100011010 . . . ".

Figure 4:
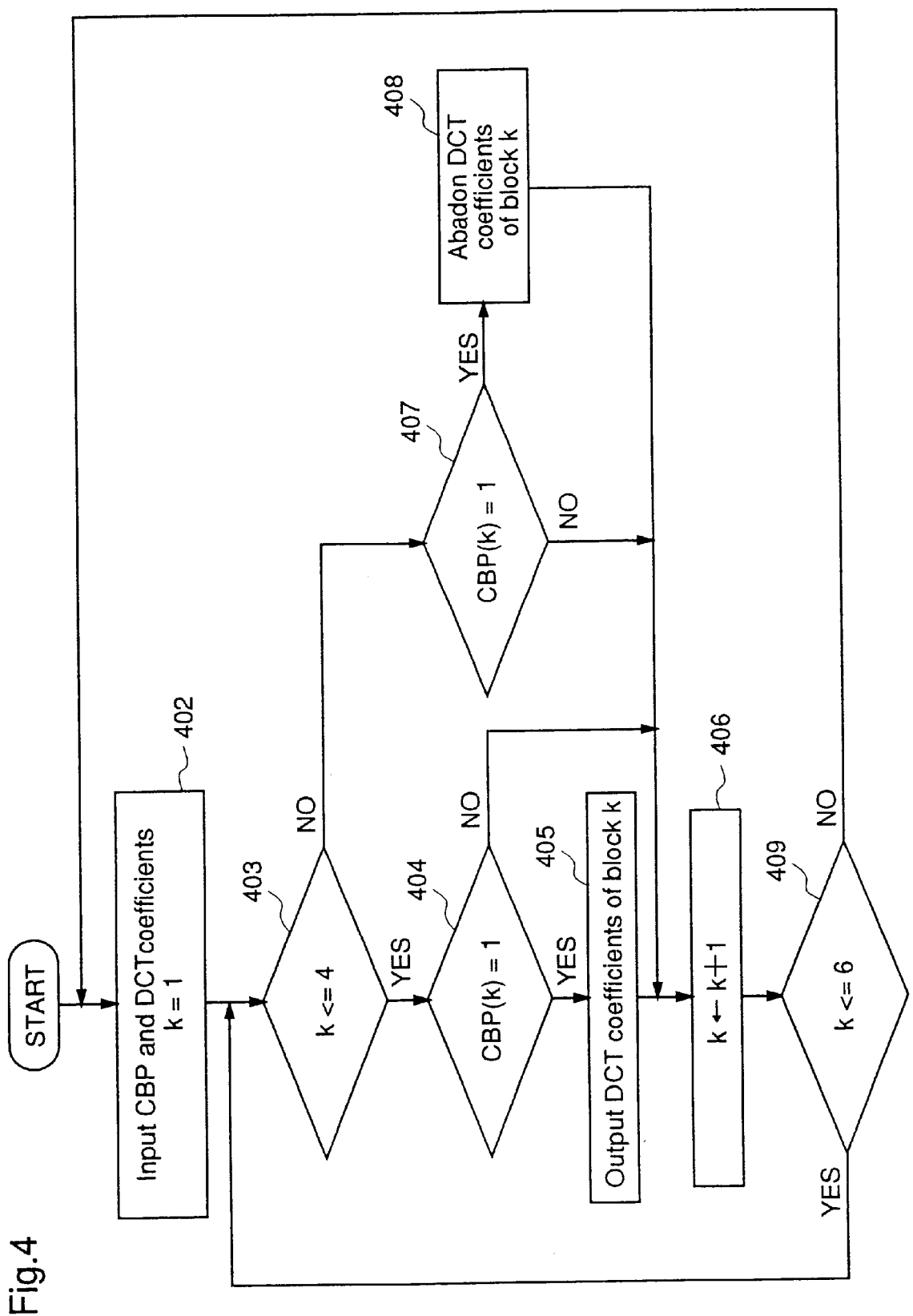
FIG. 4 is a diagram showing flow of a process for abandoning coded data corresponding to color difference blocks in the digital image decoding apparatus.
Figure 5:
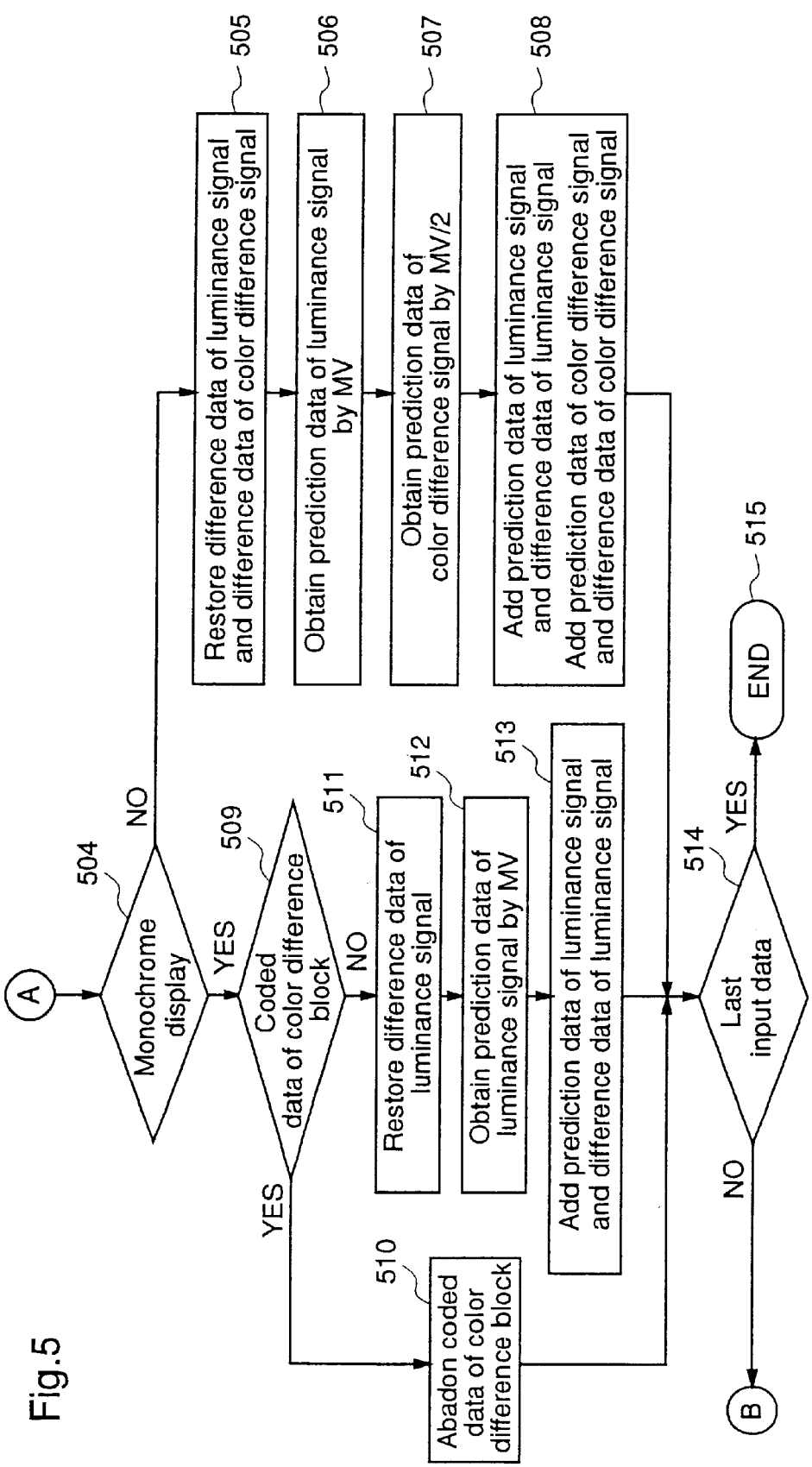
FIG. 5 is a diagram showing flow of a process for decoding inter-block coded data by the digital image decoding apparatus.

Subsequently, a description is given of the image decoding apparatus of this embodiment along flow in FIGS. 3–5.

When the bit stream 200 in FIG. 2 is input to the input terminal 101 of the image decoding apparatus 100 in step 301, the input coded data is subjected to code decoding process by the variable length decoding unit 100a in step 302. To be specific, a code of a fixed length is allocated from the bit stream, and then this binary code is converted into a numeric value (data) For the variable length code, a code matching this is checked with reference to the code table, and data corresponding to the code is output.

To be more detailed, the input coded data is temporarily stored in the shifter 102 in 16 bits or 32 bits, and then the coded data is supplied to the code decoder 103. The code decoder 103 makes comparison between a head code of the input coded data and plural codes in the code table contained therein, and then outputs data corresponding to the code in the code table which matches the head code as a first output 124, and bit-length data indicating a bit length (CL) of the code as a second output 125. The-bit length data is fed back to the shifter 102. The shifter 102 shifts the coded data by the bit length (CL), and sends the 16-bit or 32-bit coded data stored therein to the code decoder 103. The first output 124 is supplied to the controller 105, and output to any of output terminals 107, 108, and 141 of the switch 106.

In step 303, the controller 105 decides whether the target macroblock to-be-decoded is the intra-macroblock or the inter-macroblock according to the PTYPE data supplied thereto from the output terminal 108. The switch 150 is tuned off when the target macroblock is the intra-macroblock, while the switch 150 is turned on when it is the inter-macroblock, in accordance with the control signal 140d from the controller 105.

Where the target macroblock is the intra-macroblock, in step 304, the controller 105 decides whether the display mode is the monochrome display mode or the color display mode, according to the mode signal 123 supplied to the input terminal 104. On the other hand, where the target macroblock is the inter-macroblock, the controller 105 performs the same operation in step 504.

A description will now be given of a case where the target macroblock is the intra-macroblock with reference to FIG. 3.

When decided that the display mode is not the monochrome display mode in step 304, in step 305, switching of the switch 106 is controlled by the controller 105 so that the output of the code decoder 103 is output from the output terminal 108. Thereby, the coded data corresponding to 4 luminance blocks and the coded data corresponding to 2 color difference blocks of the target macroblock are sequentially input to the information source decoding unit 100b, where the luminance signal and the color difference signal corresponding to the target macroblock are reproduced. More specifically, the quantization values of the coded data of each macroblock are inversely quantized into DCT coefficients by the inverse quantizer 109, and then the DCT coefficients of each macroblock are transformed into an image signal of each macroblock by the inverse DCT unit 110.

On the other hand, when decided that the display mode is the monochrome display mode in step 304, in step 306, the controller 105 decides whether or not the data input to the variable length decoding unit 100a is the coded data corresponding to the color difference blocks. When decided that the coded data corresponds to the color difference blocks in step 306, in step 308, switching of the switch 106 is controlled by the control signal 140a from the controller 105 so that the output of the code decoder 103 is supplied to the output terminal 107. Thereby, the coded data corresponding to the color difference blocks is abandoned. At this time, the DCT coefficients and the EOB data of the color difference blocks (5) and (6) are abandoned.

When decided that the coded data corresponds to the luminance blocks in step 306, in step 307, switching of the switch 106 is controlled by the control signal 140a from the controller 105 so that the output of the code decoder 103 is supplied to the output terminal 108. Thereby, the coded data corresponding to the luminance blocks is supplied to the information source decoding unit 100b, where inverse quantization process and inverse DCT process are sequentially performed thereto.

In this manner, the image signal of the macroblock is reproduced by decoding process in respective display modes.

In step 309, it is decided whether or not the input coded corresponds to last coded data, and when decided that it does not, the steps 301–309 are performed, while when decided that it does, coding process is completed.

Subsequently, a description will be given of a case where the coded data corresponding to the color difference blocks is abandoned, with reference to FIG. 4.

In step 402, the decoded CBP data of the target macroblock and the quantization values of the DCT coefficients of a first luminance block of the target macroblock are sequentially input to the controller 105. At this time, a counter's value "k" is set to "1" Instep 403, the controller 105 decides whether or not the value "k" is below "4".

When decided that the value "k" is 4 or less, it is decided that the quantization values input to the information source decoding unit 100b corresponds to those of the DCT coefficients of the luminance block. Then in step 404, it is decided whether or not the bit value CBP (k) of CBP data of a k-th subblock of the target macroblock is "1". When decided that the CBP (k)=0, in step 406, the value "k" is incremented by one, since the subblock contains no DCT coefficients.

On the other hand, when decided that the CBP(k)=1 in step 404, in step 405, switching of the switch 106 is controlled so that the quantization values of the DCT coefficients and the quantization value of the EOB data of the subblock (k) are output to the information source decoding unit 100b. Then, in step 406, the value "k" is incremented by one.

When decided that "k"=5 or 6 in step 403, and it is therefore decided the subblock (k) corresponds to the color difference block, in step 407, it is decided whether or not the CBP(k)=1. When decided that the CBP(k)=1, switching of the switch 106 is controlled so that the quantization values of the DCT coefficients and the quantization value of the EOB data of the subblock (k) are supplied to the terminal 107. Thereby, the DCT coefficients of the subblock (k) corresponding to the color difference block are abandoned. On the other hand, when decided that the CBP(k)=0 in step 404, in step 406, the value "k" is incremented by one, since the subblock contains no DCT coefficients.

In step 409, it is decided whether or not the value "k" is below "6", and when decided that the value "k" is 6 or less, the steps 403–409 are performed. On the other hand, when decided that the value "k" is larger than "6", in the steps 402–409, DCT coefficients of a color difference block of a subsequent macroblock are abandoned. The steps 402–409 in FIG. 4 correspond to the steps 306–308 in FIG. 3 and the steps 509–513 in FIG. 5.

Hereinafter, a description is given of processing of the inter-macroblock with reference to FIG. 5.

Figure 3:
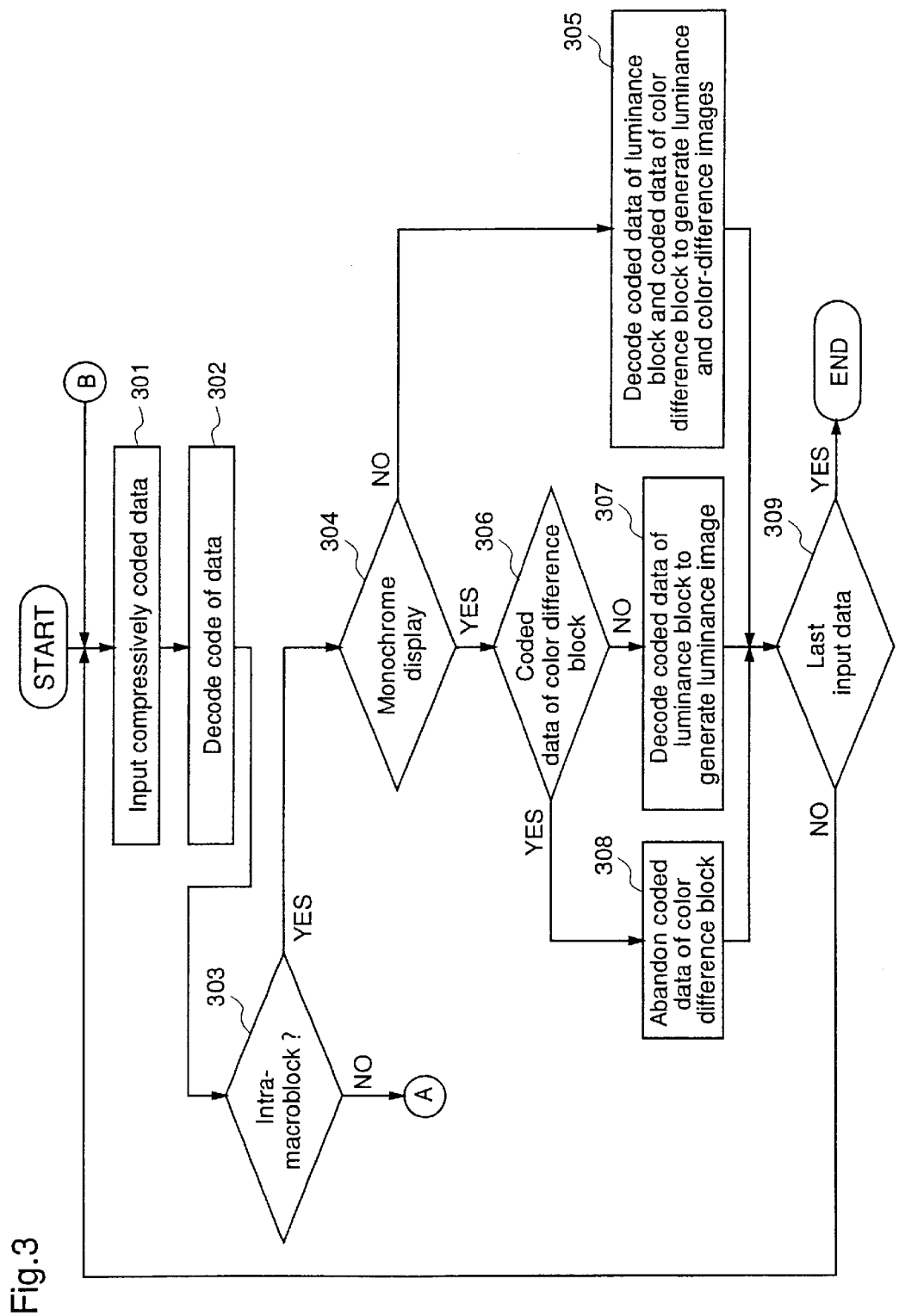
FIG. 3 is a diagram showing flow of a process for decoding intra-block coded data by the digital image decoding apparatus.

When decided that the target macroblock is the inter-macroblock in step 303 in FIG. 3, the controller 105 decides whether or not the display mode is the monochrome display mode in step 504.

When decided that the display mode is not the monochrome display mode, in step 505, coded data corresponding to the luminance blocks and coded data corresponding to the color difference blocks are decoded, to generate a difference value of the luminance signal (difference data of the luminance signal) and a difference value of the color difference signal (difference data of the color difference signal). The quantization value for the difference value of the luminance signal and the quantization value for the difference value of the color difference signal are subjected to inverse quantization and inverse DCT processes.

Specifically, the switch 106 is controlled by the controller 105 so that the input terminal 106a thereof is connected to the output terminal 141, and thereby the motion vector MV is sent to the first address generator 112. Then, the input terminal 106a of the switch 106 is connected to the output terminal 108, and thereby the CBP data is sent to the controller 105 as the output 126. The quantization values of the DCT coefficients of subblocks of the target macroblock are supplied to the inverse quantizer 109 as the output of the switch 106, and inversely quantized into the DCT coefficients. The DCT coefficients are supplied to the inverse DCT unit 110, and restored to the difference data of the luminance signal and difference data of the color difference signal. The EOB data is sent to the controller 105 as the output 126 of the switch 106. The controller 105 computes the number of subblocks of one macroblock from the CBP data and the EOB data. For instance, in case of the macroblock M(j), when the number of the subblocks becomes "6", the first switch 106 is controlled so that the input terminal 106a is again connected to the output terminal 141.

In step 506, prediction data of the luminance signal is obtained by the use of the motion vector MV. In this embodiment, the motion vector MV is added to a coordinate of the luminance block to-be-decoded on a display screen, to generate an address of the frame memory which contains the luminance signal of the decoded luminance block, and the luminance signal of the luminance block on the frame memory indicated by this generated address is used as the prediction data.

To be more detailed, the motion vector MV is supplied to the first address generator 112 as the output 128 of the switch 106. The address generator 112 converts it into the address of the frame memory 113. This conversion is performed by adding the motion vector MV to the coordinate of the luminance block to-be-reproduced, and the resulting generated address is sent through the switch 117 to the frame memory 113.

In step 507, the motion vector MV is sent through the switch 116 to the motion vector scaling unit 114, where it is scaled. In this case, the value for the motion vector of the scale of the luminance block is divided by 2 so that the scale corresponds to that of the color difference block. This is because the color difference block comprises pixels in which plural pixels of the macroblock have been reduced by one-half in the vertical and horizontal directions. The motion vector MV resulting from the scaling operation is converted into the address of the frame memory 113 by the address generator 115, and is sent through the switch 117 to the frame-memory 113, where the prediction data of the color difference signal is obtained.

Thereafter, in step 508, the image signal of the luminance block which is located at the position indicated by the output address of the generator 112 is output from the frame memory 113 as luminance prediction data. The luminance prediction data is added to the difference data of the luminance signal by the adder 111 to reproduce the luminance signal. In addition, the image signal of the color difference block which is located at the position indicated by the address of the generator 112 is output from the frame memory 113 as the color difference prediction data. The color difference prediction data is added to the difference data of the color difference signal by the adder 111 to reproduce the color difference signal.

The luminance signal and the color difference signal are thus reproduced and output. Simultaneously, these luminance and color difference signals are stored in the frame memory 113 as image signals of reference frames in the process for decoding coded data of a subsequent frame On the other hand, in step 504, when decided that the display mode is the monochrome mode, in step 509, the controller 105 decides whether or not the coded data output from the variable length decoding unit 100a corresponds to the color difference blocks. When decided that it does, in step 510, the coded data corresponding to the color difference blocks is abandoned.

When decided that the output of the variable length decoding unit 100a does not correspond to the color difference block, in step 511, the difference data of the luminance signal is produced, and further, in step 512, the luminance prediction data is obtained by the use of the motion vector MV. In step 513, the difference data of the luminance signal and the prediction data of the luminance signal are added to reproduce the luminance signal.

To be more detailed, when decided that the display mode is the monochrome display mode, the input terminal 106a of the switch 106 is connected to the output terminal 141, and thereby the motion vector is sent to the address generator 112. Then, the input terminal 106a of the switch 106 is connected to the output terminal 108, and thereby the CBP data is sent to the controller 105 as the output 127. While the quantization values of the DCT coefficients are sent to the inverse quantizer 109 as the output 126 of the switch 106, the switch 106 is controlled so that only the quantization values of the luminance blocks are supplied to the inverse quantizer 109.

The controller 105 computes the number of subblocks of the macroblock from the CBP data and the EOB data. At a starting point of processing a first subblock of each macroblock, the counter's value "k" is set to "0". When the value of the CBP data of the k-th subblock is "1", and this subblock includes EOB data, or when the value of the CBP data of the k-th subblock is "0", the counter's value "k" is incremented by one. When the value "k" is "5" or "6", the data to-be-processed is coded data corresponding to the color difference blocks, and therefore, the input terminal 106a of the switch 106 is connected to the output terminal 107, and thereby the coefficients of the color difference signal are abandoned.

Thus sent quantization values of the DCT coefficients of the luminance block are subjected to inverse quantization process and inverse DCT process to produce the difference data of the luminance signal. Simultaneously, the luminance prediction data is produced according to the motion vector, and the luminance prediction data and the difference data of the luminance signal are added by the adder 111.

As described above, when the display mode is the monochrome display mode, the switch 116 is turned off, so that the motion vector is not scaled, and therefore the terminal 117a is not connected to the input terminal 119. Thus, only the luminance image is regenerated and output, and simultaneously stored in the frame memory 113.

In step 514, it is decided whether or not the input coded data corresponds to last coded data, and when decided that it does not, the steps 301–303 and 504–509 are performed, whereas when decided that it does, coding process is completed.

In this embodiment, in the monochrome display mode, the color difference signal is not subjected to inverse quantization and inverse DCT processes, and motion compensation process is not performed, either. As a result, amount of signals to-be-processed in decoding process is reduced.

In other words, when intra-frame coded or inter-frame coded digital image signal is decoded for image display, coded data of the color difference signal is abandoned in the monochrome display mode, and therefore decoding of the coded data of the color difference signal is dispensed with.

In the decoding process, it is required that the luminance signal (Y) and the color difference signals (U, V) be converted into the RBG signal by means of the equations (1)–(3) as already described. However, since the color difference signals are abandoned as described above, a term of the luminance signal Y remains in the equations, and therefore, the YUV signal can be converted into the RGB signal with fewer calculations.

Since the data of the color difference signals (U, V) are not decoded and reproduced in the monochrome display mode, amount of data to be decoded is reduced by ⅓, and thereby power which display terminal equipment requires can be significantly saved. As a result, portable terminal equipment can display an image for a long period of time.

While the description has been give of the case where the DCT transform is employed in the coding process, the present invention is applicable to a case where data coded by a coding method such as the wavelet coding is decoded. In this case, in the monochrome display mode, a boundary between the luminance data and the color difference data of a bit stream is detected, and the color difference data is abandoned. As a result, decoding of the color difference data is dispensed with.

In addition, the image signal to-be-decoded maybe image signals of respective objects each having an arbitrary shape rather than the image signal of one display screen.

In this case, the image signals each comprises a shape signal indicating a shape of an object as well as the luminance signal and the color difference signal, so that only the luminance signal and the shape signal are decoded and reproduced in the monochrome display mode.

In this image display, since the image signals are generally synthesized before image display, and the luminance signal and the shape signal are decoded and reproduced in the monochrome display mode. Thereby, amount of signals to be processed for image-composition can be greatly reduced, which results in effective power saving.

While the last DCT coefficient of the DCT coefficient group is indicated by the EOB data in the bit stream 200 in the above embodiment, the EOB data may be replaced by an identification bit indicating whether or not d code of a quantized DCT coefficient corresponds to a code of the last DCT coefficient.

Figure 9:
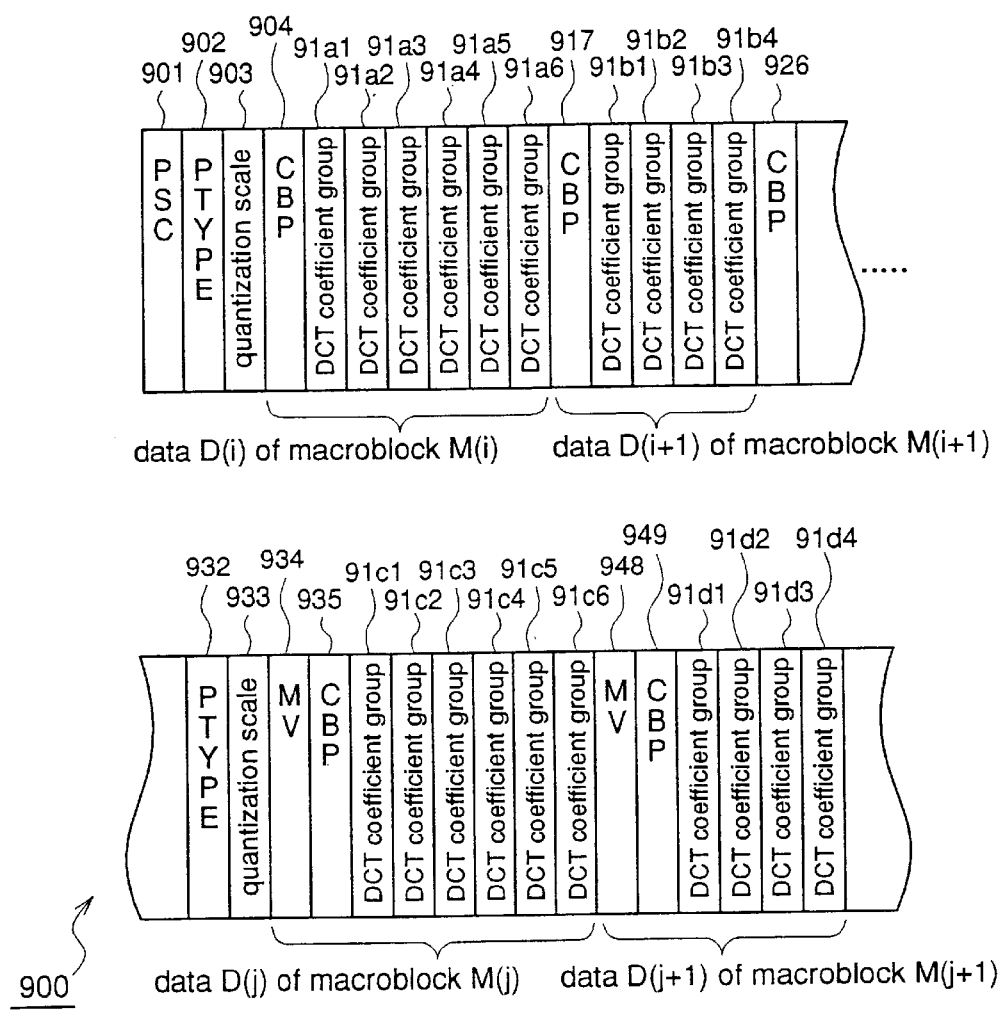
FIG. 9 is a diagram showing a structure of a coded bit stream including a code which contains an identification bit indicative of the last DCT coefficient, which replaces codes of the DCT coefficients and the EOB data of the coded bit stream of the above embodiment.

FIG. 9 shows a coded bit stream 900 which uses the code described above. The coded bit stream 900 contains no EOB data included in each block information of the bit stream 200 and codes of DCT coefficients of each DCT coefficient group contain the identification bits.

With reference to FIG. 9, the bit stream 900 comprises a synchronous signal (PSC) 901 indicating a starting point of an image signal of a display screen, by a unique 32-bit code, PTYPE data 902 and 932 each indicating whether the image signal has been intra-frame coded or inter-frame coded, by the use of a 2-bit code, quantization scale data 903 and 933 each indicating a quantization scale in quantization of the coding process by a 5-bit code, and data D(i), D(i+1), . . . , D(j), D(j+1), . . . corresponding to macroblocks M(i), M(i+1), . . . , M(j), M(j+1), . . . , respectively. The PTYPE data 902 indicates the intra-frame coding and the PTYPE data 932 indicates the inter-frame coding. The macroblocks M(i) and M(i+1) are intra-macroblocks in which the corresponding image signals have been intra-frame coded. The macroblocks M(j), and M (j+1) are inter-macroblocks in which the corresponding image signals have been inter-frame coded.

The data D(i) comprises CBP data 904 and OCT coefficient groups 91a1–91a6, and the data D(i+1) comprises CBP data 917 and DCT coefficient groups 91b1–91b4. The CBP data 904 and 917 are each represented as a 6-bit code, and each indicates whether or not each subblock of the corresponding macroblock contains DCT coefficients by the use of one bit. In the CBP data 904 and 917, the code is "1" when the subblock contains DCT coefficients, and the code is "0" when the subblock contains no DCT coefficients.

The data D(j) comprises a variable length coded motion vector 934, CBP data 935, and DCT coefficient groups 91c1–91c6, and the data D(j+1) comprises a variable length coded motion vector 948, CBP data 949, and DCT coefficient groups 91d1–91d4. The CBP data 935 and 949 are each represented as a 6-bit code, and each indicates whether or not each subblock of the corresponding macroblock contains DCT coefficients by the use of one bit. In the CBP data 935 and 949, the code is "1" when the subblock contains DCT coefficients, and the code is "0" when the subblock contains no DCT coefficients.

In this bit stream 900, data corresponding to respective macroblocks of a display screen is sequentially aligned.

In the DCT coefficient groups 91a1–91a6, 91b1–91b4, 91c1–91c6, and 91d1–91d4, aligned are codes obtained by variable length coding of quantization values of plural DCT coefficients.

Hereinafter, a description is given of this variable length coding with reference to FIGS. 10(a)–10(e).

FIG. 10(a) shows an array of DCT coefficients obtained by subjecting an image signal of a subblock to DCT process, in a frequency domain, and FIG. 10(b) shows the order in which quantization values obtained by quantizing the DCT coefficients are variable length coded. The FIGS. 10(a) and 10(b) are identical to FIGS. 8(a) and 8(b).

FIG. 10(c) shows correspondence between the quantized DCT coefficients (quantization values) and codes obtained by performing variable length coding thereto. In the variable length coding process of the quantization values, combination (event) of a level of a quantization value "non-zero" (level), the number of quantization values "zero" (run) positioned ahead of the quantization value "non-zero" in the scanning order, and the identification bit (last) indicating whether or not the quantization value "non-zero" is lastly variable length coded among quantization values of one subblock, is converted into one variable length code according to a variable length code table Ta in FIG. 10(d). The variable length coding table Ta lists variable length codes of respective events. In this table Ta, a code "10" of the EOB data in FIG. 8(d) is not shown. It should be remembered that actual quantization levels have positive and negative values, although these are not shown for simplicity.

Assume that the quantization values A–D are A=1, B=2, C=1, and D=2, respectively. The quantization value A forms an event (0,0, 1), and is converted into a variable length code "11" according to the table Ta. In a like manner, the quantization values B, C, and D form events (0,0,2), (0,3, 1), and (1,1,2), and are converted into variable length codes "0100", "00111", and "000100", respectively, according to the table Ta.

The code string of the DCT coefficient group of the subblock in FIG. 10(a) is, as shown in FIG. 10(e), ". . . 11010000111000100 . . . ".

By way of example, in digital image decoding apparatus which receives the coded bit stream 900 as an input, the code decoder 103 of the image decoding apparatus 100 is adapted to decode the variable length code to obtain the event (last, run, level), and decide whether or not the DCT coefficient of the event is the last DCT coefficient from the first element (identification bit) of the event.

For instance, in a case where a variable length code "00111" of the bit stream is decoded, since "last" (identification bit) as a first element of an event (0,3,1) is "0", it is decided that the DCT coefficient of plural DCT coefficients of the corresponding subblock is not the last DCT coefficient. In another case where a variable length code "000100" is decoded, since "last" (identification bit) as a first element of an event (1,1,2) is "1", it is decided that the DCT coefficient of plural DCT coefficients of the corresponding subblock is the last DCT coefficient, as shown in FIG. 10(c). Thus, in this digital image decoding apparatus, the controller 105 controls decoding by the use of the identification bits of the variable length codes of the DCT coefficients in the same manner that it controls decoding by the use of the EOB data of the coded bit stream 200 in FIG. 2.

Furthermore, a decoding program for implementing the digital image decoding method shown in the above embodiment is recorded in a data recording medium such as a floppy disc, whereby processing is performed with ease in an independent computer system.

FIGS. 6(a)–6(c) are diagrams showing a case where image processing according to the digital image decoding method in the above embodiment is performed in a computer system by the use of a floppy disc which, contains the decoding program.

Figure 6:
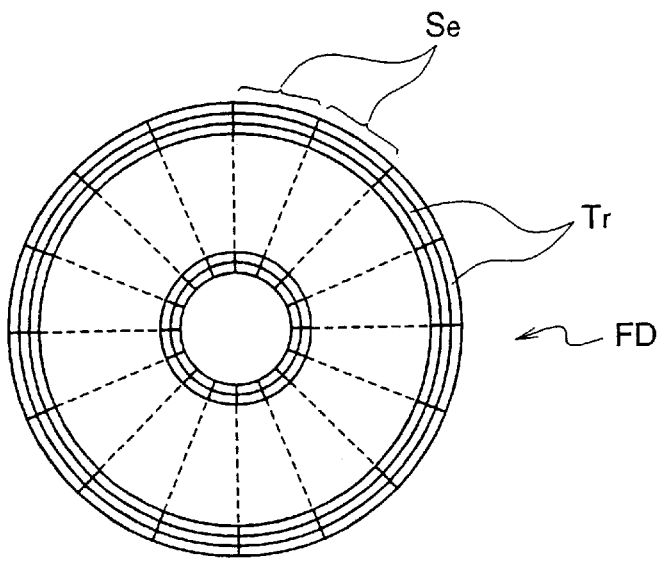
FIGS. 6(a)–6(c) are diagrams for explaining a data recording medium which contains a program for implementing the digital image decoding method in a computer system.
Figure 6:
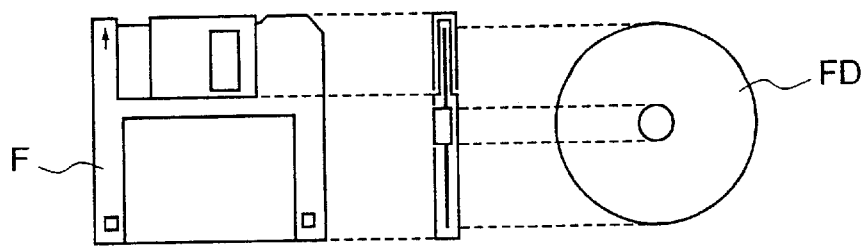
Figure 6:
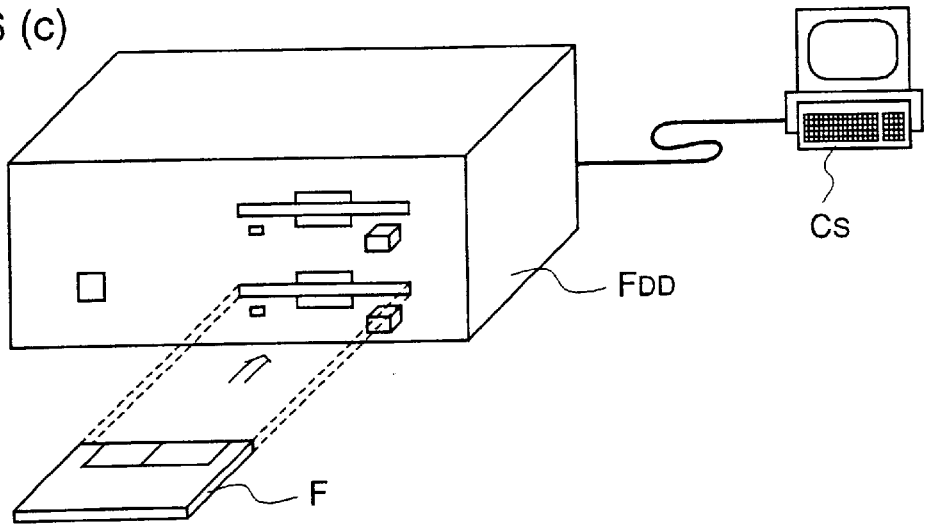

FIG. 6 (b) shows a front appearance and a cross-section of a floppy disc FD, and the floppy disc FD. FIG. 6(a) shows a physical format of the floppy disc FD as the data recording medium. The floppy disc FD is stored in a case F, and in a surface of the disc FD, plural tracks Trs are formed from outer to inner radius thereof, each track being divided into 16 sectors Se in angle direction. Therefore, in the floppy disc FD which contains the program, data of the program is recorded in an allocated region of the floppy disc FD.

FIG. 6(c) shows a construction of recording and reproducing the program in/from the floppy disc FD. In case of recording the program in the floppy disc FD, the data of the program is written thereto through a floppy disc drive FDD from the computer system Cs. In another case of constructing the image decoding method in the computer system Cs by the program in the floppy disc FD, the program is read from the floppy disc FD by the use of the floppy disc drive FDD and transferred to the computer system Cs.

While the description has been given of image processing in a computer system by the use of the floppy disc as the data recording medium, this image processing can be also performed by the use of an optical disc. Besides, the recording medium is not limited to this, and an IC card, a ROM cassette, and so forth, may be used so long as they can record a program therein.

What is claimed is:

1. An image decoding method for decoding variable-length coded data including compressively coded data obtained by coding a luminance signal and a color difference signal to reproduce an image signal for image display, said method comprising:
   a variable-length decoding step for decoding the variable-length coded data; and
   a decompressive decoding step for decompressively decoding the compressively coded data obtained by said variable-length decoding step;
   the compressively coded data of the luminance signal and the compressively coded data of the color difference signal obtained by said variable-length decoding step being decompressively decoded in the color display mode of color image display; and
   the compressively coded data of the color difference signal being detected and abandoned in said variable-length decoding step and the compressively coded data of the luminance signal being decompressively decoded in said decompressive decoding step, in the monochrome display mode of the monochrome image display.

2. The image decoding method of claim 1 wherein
   the variable-length coded data is a bit stream in which codes of plural transform coefficients obtained by subjecting the luminance signal to frequency transform, and codes of plural transform coefficients obtained by subjecting the color difference signal to frequency transform, are aligned together with control data so as to correspond to a processing unit region of a prescribed size on a display screen, and
   in the monochrome display mode, a code of a last transform coefficient of the luminance signal and a code of a last transform coefficient of the color difference signal are detected, and codes of transform coefficients between a heading transform coefficient of the color difference signal which is disposed next to the code of the last transform coefficient of the luminance signal and a code of the last transform coefficient of the color difference signal are abandoned in said variable-length decoding step.

3. The image decoding method of claim 2 wherein the code of the last transform coefficients of the luminance signal and the color difference signal are respectively detected according to indication data which is disposed immediately after the code of the last transform coefficient in the bit stream and indicating that the code disposed immediately before the indication code is the code of the last transform coefficient.

4. The image decoding method of claim 2 wherein the code of each transform coefficient is a unique code indicating whether or not the transform coefficient is the last transform coefficient.

5. An image decoding method for generating difference values of a luminance signal and a color difference signal with respect to their respective prediction values in each processing unit region on a display screen, and decoding variable-length coded data including transform coefficients obtained by subjecting the difference values of respective signals to frequency transform and quantization and a motion vector generated when the prediction value of the luminance signal is generated, to reproduce an image signal for image display, said method comprising:
   a variable-length decoding step for decoding the variable-length coded data to generate transform coefficients of the luminance signal and the color difference signal;
   a decompressive decoding step for decompressively decoding the transform coefficients of the luminance signal and a color difference signal;
   wherein, in the color display mode of color image display, a difference value restoring step, a luminance signal reproducing step, a scaling step, and a color difference signal reproducing step are performed as said decompressive decoding step;
   said difference value restoring step being the step for restoring the transform coefficients of the luminance signal and the transform coefficients of the color difference signal to the difference value of the luminance signal and the difference value of the color difference signal, respectively, by inverse quantization and inverse frequency transform;
   said luminance signal reproducing step being the step for obtaining the prediction value of the luminance signal by the use of the motion vector and adding the prediction value and the difference value of the luminance signal to reproduce the luminance signal;
   said scaling step being the step for converting a scale of the motion vector of the luminance signal to a scale of a motion vector of the color difference signal; and said color difference signal reproducing step being the step for obtaining the prediction value of the color difference signal by the use of the scaled motion vector and adding the prediction value and the difference value of the color difference signal to reproduce the color difference signal; and
   in the monochrome display mode of the monochrome image display, the transform coefficients of the color difference signal are detected and discarded in said variable-length decoding step and difference value restoring step and a luminance signal reproducing step are performed as said decompressive decoding step:

said difference value restoring step being the step for restoring the transform coefficients of the luminance signal to the difference value of the luminance signal by inverse quantization and inverse frequency conversion; and said luminance signal reproducing step being the step for obtaining the prediction value of the luminance signal by the use of the motion vector, and adding the prediction value and the difference value of the luminance signal to reproduce the luminance signal.

6. An image decoding apparatus for decoding coded signal including coded data obtained by coding a luminance signal and a color difference signal to reproduce an image signal for image display, said apparatus comprising:

mode signal generating means for outputting a display mode signal which indicates that the display mode is a monochrome display mode, in the case where the power consumption is controlled, and outputting a display mode signal which indicates that the display mode signal is a color display mode, in the case where the power consumption is not controlled;

mode decision means for deciding that one of the color display mode of color image display and the monochrome display mode of monochrome image display is set, on the basis of the display mode signal;

data selecting means for receiving the output of the mode decision means, and outputting the coded data of the luminance signal and the coded data of the color difference signal in the color display mode, and outputting the coded data luminance signal and abandoning the coded data of the color difference signal in the monochrome display mode; and decoding means for decoding coded data output from the data selecting means.

7. The image decoding apparatus of claim 6 wherein the coded signal is a variable-length coded bit stream which includes plural luminance transform coefficients obtained by subjecting the luminance signal to coding with frequency transform and plural color difference transform coefficients obtained by subjecting the color difference signal to coding with frequency transform, the data selecting means includes a data decoder for decoding the bit stream, outputs the luminance transform coefficients and the color difference transform coefficients obtained by decoding the bit stream in the color display mode, and abandons the color difference transform coefficients and outputs the luminance transform coefficients in the monochrome display mode, and the decoding means subjects decoding with inverse frequency transform to the transform coefficients output from the data selecting means.

8. An image decoding apparatus for generating difference values of a luminance signal and a color difference signal with respect to their respective prediction values in each processing unit region on a display screen, and decoding compressively coded data including transform coefficients obtained by subjecting the difference values of respective signals to frequency transform and a motion vector generated when the prediction value of the luminance signal is generated, to reproduce an image signal for image display, said apparatus comprising:

a frame memory for storing a reproduced luminance signal and a reproduced color difference signal;

mode decision means for deciding that one of a color display mode of color image display and a monochrome display mode of monochrome image display is set;

a data decoder for subjecting the compressively coded data to code decoding and outputting transform coefficients and a motion vector of the luminance signal and transform coefficients of the color difference signal;

data selecting means for receiving the output of the mode decision means, and outputting transform coefficients of the luminance signal and transform coefficients of the color difference signal in the color display mode, and outputting the transform coefficients of the luminance signal and abandoning the transform coefficients of the color difference signal in the monochrome display mode;

decoding means for performing decoding with inverse frequency transform to the transform coefficients output from the data selecting means to generate the difference value of one of the luminance signal and the color difference signal;

a motion compensator for receiving the output of the mode decision means, obtaining the prediction value of the luminance signal from the frame memory by the use of the motion vector, performing scaling so that a scale of the motion vector of the luminance signal is converted to a scale of a motion vector of the color difference signal, and obtaining the prediction value of the color difference signal from the frame memory by the use of the scaled motion vector, in the color display mode, and obtaining the prediction value of the luminance signal from the frame memory by the use of the motion vector in the monochrome display mode; and an adder for performing addition by adding the difference value and the prediction value of the luminance signal or by adding the difference value and the prediction value of the color difference value, to produce one of the reproduced luminance signal and the reproduced color difference signal, and storing the reproduced luminance signal and the reproduced color difference signal in the frame memory.

9. A data recording medium which contains an image processing program, said image processing program making a computer perform image processing by an image decoding method of claim 1.

10. A data recording medium which contains an image processing program, said image processing program making a computer perform image processing by an image decoding method of claim 2.

11. A data recording medium which contains an image processing program, said image processing program making a computer perform image processing by an image decoding method of claim 3.

12. A data recording medium which contains an image processing program,, said image processing program making a computer perform image processing by an image decoding method of claim 4.

13. A data recording medium which contains an image processing program, said image processing program making a computer perform image processing by an image decoding method of claim 5.

14. An image decoding apparatus for generating difference values of a luminance signal and a color difference signal with respect to their respective prediction values in each processing unit region on a display screen, and decoding variable-length coded data including transform coefficients obtained by subjecting the difference values of respective signals to compressive coding with frequency transform and quantization and a motion vector generated when the prediction value of the luminance signal is generated, to reproduce an image signal for image display, said apparatus comprising:

- a frame memory for storing a reproduced luminance signal and a reproduced color difference signal;
- mode decision means for deciding that one of a color display mode of color image display and a monochrome display mode of monochrome image display is set;
- a variable-length decoder for decoding the variable-length coded data and outputting transform coefficients and a motion vector of the luminance signal and transform coefficients of the color difference signal;
- data selecting means for receiving the output of the mode decision means, and outputting transform coefficients of the luminance signal and transform coefficients of the color difference signal in the color display mode, and outputting the transform coefficients of the luminance signal and abandoning the transform coefficients of the color difference signal in the monochrome display mode;
- decoding means for subjecting decompressively decoding with inverse quantization and inverse frequency transform to the transform coefficients output from the data selecting means to generate the difference value of one of the luminance signal and the color difference signal;
- a motion compensator for receiving the output of the mode decision means, obtaining the prediction value of the luminance signal from the frame memory by the use of the motion vector, performing scaling so that a scale of the motion vector of the luminance signal is converted to a scale of a motion vector of the color difference signal, and obtaining the prediction value of the color difference signal from the frame memory by the use of the scaled motion vector, in the color display mode, and obtaining the prediction value of the luminance signal from the frame memory by the use of the motion vector in the monochrome display mode; and
- an adder for performing addition by adding the difference value and the prediction value of the luminance signal or by adding the difference value and the prediction value of the color difference value, to produce one of the reproduced luminance signal and the reproduced color difference signal, and storing the reproduced luminance signal and the reproduced color difference signal in the frame memory.

* * * * *